United States Patent [19]

Edgington et al.

[11] Patent Number: 5,728,490
[45] Date of Patent: Mar. 17, 1998

[54] BATTERY ELECTRODE SUBSTRATES AND METHODS OF MAKING THE SAME

[75] Inventors: Robert J. Edgington, Granger; James A. Stepro; Harold J. Wissell, both of Mishawaka, all of Ind.; Scott A. Lundberg, Niles, Mich.

[73] Assignee: National-Standard Company, Niles, Mich.

[21] Appl. No.: 671,527

[22] Filed: Jun. 27, 1996

Related U.S. Application Data

[62] Division of Ser. No. 318,489, Oct. 5, 1994, Pat. No. 5,589,301, which is a continuation of Ser. No. 979,830, Nov. 20, 1992, abandoned.

[51] Int. Cl.$^6$ .................................................... H01M 4/64
[52] U.S. Cl. ............................................ 429/235; 429/246
[58] Field of Search ................................ 429/235, 246

[56] References Cited

U.S. PATENT DOCUMENTS

| | | |
|---|---|---|
| 3,174,219 | 3/1965 | Horn et al. |
| 3,657,014 | 4/1972 | Faber. |
| 3,910,799 | 10/1975 | Kondo et al. |
| 4,091,176 | 5/1978 | Alfenaar. |
| 4,223,081 | 9/1980 | Faber. |
| 4,292,357 | 9/1981 | Erisman et al. |
| 4,370,214 | 1/1983 | Kadija. |
| 4,386,987 | 6/1983 | Covitch et al. |
| 4,404,267 | 9/1983 | Iacovangelo et al. |
| 4,439,916 | 4/1984 | Faber. |
| 4,460,666 | 7/1984 | Dinkler et al. |
| 4,510,219 | 4/1985 | Rowlette. |
| 4,604,333 | 8/1986 | Ikeda et al. |
| 4,623,600 | 11/1986 | Fritts et al. |
| 4,687,553 | 8/1987 | Solomon et al. |
| 4,687,719 | 8/1987 | Von Benda et al. |
| 4,804,441 | 2/1989 | Brezillon. |
| 4,861,689 | 8/1989 | Clough et al. |
| 5,077,153 | 12/1991 | Grange-Cossou et al. |
| 5,106,707 | 4/1992 | Catotti et al. |
| 5,196,281 | 3/1993 | Pensabene et al. |
| 5,200,282 | 4/1993 | Ohnishi et al. |
| 5,348,823 | 9/1994 | Caillon et al. ............ 429/246 |

FOREIGN PATENT DOCUMENTS

| | | |
|---|---|---|
| 129627 | 8/1963 | European Pat. Off. |
| 3174219 | 3/1965 | Germany. |
| 63-124373 | 5/1988 | Japan. |

OTHER PUBLICATIONS

Patent Abstracts of Japan, vol. 13, No. 568 (E-861), for Kokai. No. 1-236,578 (Suzuki) Nov. 1989.

*Primary Examiner*—Stephen Kalafut
*Attorney, Agent, or Firm*—Emrich & Dithmar

[57] ABSTRACT

A three-dimensional substrate material for use in constructing battery electrodes comprises a sintered matrix material selected from the group consisting of reticulated metal foams, conductive fibers and metal powder compacts, and a porous covering layer of a polymeric mesh material, flexible metal screen or metal fibers, bonded to at least one surface of the matrix material to retain the sintered matrix material substantially within the planar surface of the surface of matrix material during spiral-wounding of the chemically loaded matrix material.

37 Claims, 5 Drawing Sheets

BATTERY ELECTRODE SUBSTRATES AND METHODS OF MAKING THE SAME

This is a divisional application of application Ser. No. 08/318,489, filed Oct. 5, 1994, now U.S. Pat. No. 5,589,301 which in turn was a file wrapper continuation application of application Ser. No. 07/979,830, filed Nov. 20, 1992 now abandoned.

BACKGROUND OF INVENTION

The present invention relates to improved three-dimensional battery electrode substrate materials and, more specifically, to a nickel electrode substrate which provides enhanced active substrate filling and retention within the electrode matrix and which permits enhanced mechanical strength and integrity during cell construction and reduced shorting between electrode layers in the cell after fabrication, thus enhancing cell manufacturing yield.

At present, rechargeable battery electrode substrates are manufactured from a wide variety of reticulated metal foams or sponge-type metal materials, metal fibers and metal powder compacts. Specifically, nickel three-dimensional battery electrodes (metal fibers) are made primarily through a sintering process utilizing a felt-type conductive porous material composed of nickel fibers and nickel powder, such, as carbonyl nickel powder. The resultant nickel battery electrodes generally contain between 75-90 weight percent nickel fiber and 10-25 weight percent nickel powder. An example of such a battery electrode is described in Japanese Patent Publication 63-12473. This publication discloses a felt-type nickel battery electrode containing long nickel fibers and nickel powder. In such an electrode, the fiber and powder provide a porous material having cavities or voids therein which on average are approximately 60 microns in diameter. After sintering of the fiber and powder porous material, the active chemicals such as, nickel and cadmium hydroxides are added or loaded into the porous material generate the electrical energy of the battery electrode by chemical reaction. The active chemicals are loaded of added to the fiber substrate of matrix by a number of techniques, including chemical of electrochemical conversion and mechanical injection of high viscosity aqueous pastes of the active materials or chemicals.

As the demand for higher capacity electrodes has increased, the prior art three-dimensional battery materials or substrates and, in particular, the prior art porous matrices or structures comprising sintered long nickel fibers and nickel powders have been found to be only partially effective in that the nickel powder contained within the fibrous substrate tends to block the entry of active chemicals into the possible loading areas within the fiber matrix. Accordingly, the reticulated metal foams, metal fiber and powder compacts, in accordance with the prior art, appear to exhibit a porosity of a level which restricts the penetration of the active chemical or chemicals to the center of the matrix, and which limits the amount of active chemicals that may be loaded into the matrix, thus resulting in reduced electrode efficiency.

A further disadvantage of such prior art three-dimensional electrode substrate structures is that the metal fiber matrix is composed of fiber lengths exceeding about a quarter and a half inch in length. It is believed that this length of long fiber was desirable to facilitate distribution of the active chemical space throughout the fiber matrix to provide an overall fiber matrix containing a predetermined weight of fiber material. Also, it has been found that the subsequent processing of such metal fiber matrices, metal foams and metal powdered compacts and layering of the electrode material results in an electrode material which possesses inadequate tensile strength and ductility, which substantially reduces the production yield of material which may be spiral-wound into cells for insertion into the completed electrode assembly.

Additionally, such prior art three-dimensional spiral-wound electrode materials possess substantial fiber ends rising from the spiral-wound surface or surfaces of the completed electrode assembly, a problem which results in a brittleness in bending which substantially increases the amount of breaking during processing of the electrode. Furthermore, the loose fiber ends and broken fibers extending from the surface of the spiral-wound electrode, which ends often times penetrate the separator material thereby resulting in a shorting out between electrodes of the finished battery assembly.

SUMMARY OF THE INVENTION

It is one object of the present invention to provide an improved three-dimensional electrode substrate possessing substantially improved loading and retention of the electrode active material.

It is still another object of the present invention to provide an improved three-dimensional battery electrode substrate possessing increased surface area, pliability, ductility, flexibility and tensile strength to provide nominal electrode substrate material particularly useful in cell construction.

Still another object of the present invention is to provide an improved battery electrode substrate which possesses superior mechanical strength and integrity and having a surface resistance to mechanical breakage and damage during cell construction and use.

Another object of the present invention is to provide an improved high capacity battery electrode substrate having a synthetic material adhered to the surface of the electrode substrate which provides enhanced active chemical substrate material filling and retention within the electrode matrix or substrate.

Still another object of the present invention is to provide an improved loaded battery electrode having a surface condition conducive to the utilization of reduced separator thickness thereby enabling battery designs that maximize cell capacity.

It is still another object of the present invention to provide an improved three-dimensional electrode substrate having a porous covering layer or means bonded and in intimate physical contact with the electrode substrate to permit chemically loading of the active material into the substrate and to prevent mechanical breakage and damage during spiral-winding and cell construction by retaining the metal foam or metal fibers within the electrode substrate from substantially penetrating the plane or surface of the electrode substrates.

It is yet another object of the present invention to provide an increased yield of useful electrode material when such material is spiral-wound to complete the electrode assembly.

It is still a further object of the present invention to provide improved methods of manufacturing the battery electrode substrate materials possessing enhanced loading and retention characteristics of the active chemical substrate material within the substrate.

In accordance with the present invention, a three-dimensional electrode substrate or matrix material, such as, a nickel prior art battery electrode, provides a conducting, porous nickel fiber matrix which accepts the active chemical materials which are loaded within the void areas of the fiber matrix. These prior art long nickel fiber matrices are comprised of nickel fibers that extended one quarter to one half inch in length, with the long nickel fibers preferably comprising between 70–90% of the total weight percent of material in the nickel battery electrode.

It has been found that by applying a synthetic or polymeric mesh material or resinous coating or web, or porous resinous fiber onto the nickel fiber-nickel powder matrix, made in accordance with the prior art, a more porous electrode structure is formed which possesses increased active chemical material loading and retention. The direct application of the synthetic mesh, porous resinous coating, or porous resinous fibers onto the sintered prior art nickel fiber-nickel powder substrate material may be accomplished in a number of ways including applying a synthetic mesh material by pressing the material in heated contact with the nickel electrode matrix structure. The synthetic mesh or web fabric is a resinous fabric which is preferably selected to provide a porous chemically resistant surface which is compatible with the electrolyte system used in the completed electrode battery. The porous resin coating may be applied to the electrode substrate material by utilizing a hot melt spray, an aqueous slurry, conventional air and wet layering, fluidized bed, electrostatics, steam calendering of a preformed fabric, and a hot calender lamination of the preformed fabric. The resin fabric, web, or coating may be bonded to one or both surfaces of the metallic substrate matrix used as the electrode or carrier for the active materials in the electrochemical cell.

In still another embodiment of the present invention, a layer of fine diameter metallic fibers may be bonded to one or more of the outer surfaces of the prior art three-dimensional battery electrode substrates. After the direct application of the multi-layered fine fibers to the three-dimensional electrode substrate, the resultant layered substrate is sintered, then calendered and sintered again prior to loading with the chemically active material by the electrode cell manufacturer. The addition of the surface network of layers of fine diameter fibers provides a lattice of increased surface area and provides a sinter-bonded surface layer to the underlying electrode substrate. The small diameter surface fiber layer may be applied to the surface of the three-dimensional battery substrate by conventional air and wet layering, aqueous spray and roll coating techniques, techniques known in the art. The resultant multi-layered battery electrode substrate provides an electrode structure which possesses increased loading and retention of the electrode active material. Additionally, the enhanced electrode substrate, coated with multiple layers of fine diameter fibers, provides a substrate surface effect which substantially reduces battery cell shorting and provides extended rechargeable battery cell life cycling performance by substantially reducing the number of metallic fiber ends extending from the surface of the electrode after the electrode is chemically loaded and then rolled or spirally-wound to complete the electrode cell assembly.

In still a further embodiment of the present invention a flexible fine mesh metal screen may be bonded to at least one surface of the long nickel fiber-nickel powder substrate to substantially reduce the number of metallic nickel fiber ends extending from the planar surface of the electrode after the electrode is chemically loaded and then rolled or spirally-wound to complete the electrode cell assembly.

The term three-dimensional battery electrode substrate generally refers to an electrode having a more extensive electrochemical structure or activity in a dimension normal to the electrodes frontal surface than does a planar electrode. Such sintered three-dimensional battery electrodes substrates are, preferably, a conductive fiber or metal fiber matrix material. However, it is within the scope of the present invention that the sintered metal matrix material may be reticulated metal foams or metal powder compacts.

The matrix of planar state-of-the-art electrodes, being constructed from metallic screen or mesh composed of wrought wire or filaments, is generally quite ductile and capable of being rolled or bent into a small diameter spiral cylinder without breakage of the filamentary elements of the matrix. The matrix of three-dimensional electrode structures generally are constructed from non-wrought metallic filaments from a sintering or electrodeposit type of process. Such electrode structures tend to be relatively less ductile in rolling or bending into a small diameter spiral cylinder and tend to exhibit a degree of brittleness with breakage of some matrix elements upon bending. These less ductile elements of the three-dimensional electrode matrix are the primary cause of shorting when they protrude from the surface of the completed electrode cell.

It is also within the scope of the prevent invention that the porous covering layer bonded to at least one surface of the three-dimensional electrode provides a loaded cell electrode structure that possesses increased conductivity and lowered resistivity over non-coated three-dimensional electrodes. This permits the electrode material of the present invention to be used in spiral-wound electrode cells as well as be used in planar or plaque cells which may be stacked in the completed cell assembly. Although such planar or button cells may be configured or stacked in a final cell assembly as a non-planar arc, in this sense, they are considered substantially planar for purposes of this disclosure.

In the present invention it is preferred that the porous covering layer be applied and bonded to both the upper and lower surfaces of the three-dimensional electrode to provide a laminate or sandwich structure. Accordingly, it is within the scope of the present invention that the proper orientation and handling of the spiral-wound chemically loaded matrix material will require that only the outside peripheral surface of the wound cell requires a bonded porous covering layer to substantially reduce the number of conductive or metallic fiber ends extending from the peripheral or planar surface of the complete electrode.

DESCRIPTION OF THE DRAWINGS

The foregoing description and other characteristics, objects, features and advantages of the present invention will become more apparent upon consideration of the following detailed description, having reference to the accompany drawings, wherein.

DESCRIPTION OF THE PREFERRED EMBODIMENTS

Referring now to the drawings wherein like numerals have been used throughout the several views to designate the same or similar parts; a fibrous nickel battery matrix, substrate or material 10 has been manufactured using conventional apparatus and techniques, as is known in the art. In the past, such nickel-fiber matrix materials have been utilized as the fiber matrix material for use in preparing nickel battery electrodes when the matrix material is calendered and pressed to size to receive nickel powder as a paste or filler material to impregnate the fiber matrices with the nickel powder.

In accordance with such prior art teachings, the prior art techniques have utilized between 70–90 percent by weight nickel fiber material and 30–10 percent by weight nickel powder as the paste or filler material to provide a conventional fiber matrix or substrate material that is sintered in a reducing atmosphere. A preferred material containing 80 percent by weight long nickel fiber and 20 percent by weight nickel powder, normally provides, for example, an end weight of 0.45 grams per square inch. This material results when the fiber matrix of 0.36 grams per square inch would be coated with 0.09 grams per square inch of nickel powder, as is known in the art. The nickel fibers are long fibers having a length in excess of 0.25 inch to 0.5 inch in length, with the nickel fibers having a nominal 25 micron diameter.

Figure 1:
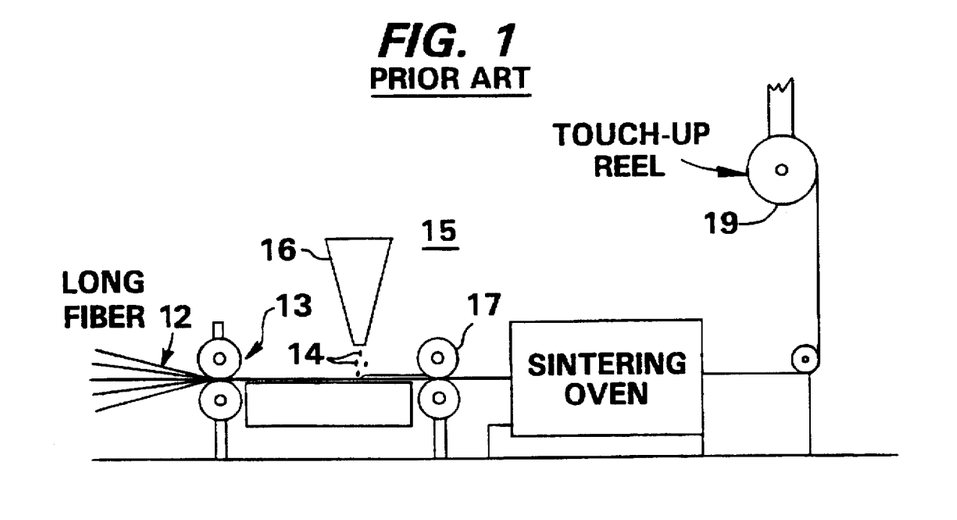
FIG. 1 is a schematic view showing the steps of manufacturing a nickel battery matrix or substrate in accordance with the prior art.

Referring now to FIG. 1, there is shown a schematic view illustrating the steps of manufacturing a nickel fiber-nickel powder matrix or substrate 10 in accordance with the prior art. Long nickel fibrous material 12 is introduced into a calendering apparatus 13 and pressed to receive the filler material, nickel powder and/or nickel oxide powder 14, which is applied by a roller coating apparatus 15, including hopper 16 and rollers 17. The filler material 14 is deposited onto the calendered and pressed fibrous material and rolled by rollers 17 to a uniformed thickness, pressing the filler material 14 into the fiber matrix to impregnate the fibrous matrix with the filler material. The nickel battery matrix or substrate 10 thus formed is then passed through a sintering oven 18 and then wound on a take up reel 19, for example, for storage prior to its use and the manufacture of the battery electrodes substrate in accordance with the present invention.

In accordance with the present invention, a synthetic or polymeric mesh material or porous covering layer means 20 may be bonded to at least one of the surfaces of the nickel fiber-nickel powder matrix 10 to provide a porous electrode structure which possesses increased active chemical material loading and retention as well as providing a substantial reduction in the number of metallic fiber ends which extend from the surface of the electrode after the electrode is chemically loaded and then rolled or spirally-wound to complete the cell assembly. A suitable polymeric or nylon mesh material useful in practicing the present invention may be a polyester, polyolefin, polyamide, or other synthetic material. One commercial material useful in the present invention is marketed under the trademark SHARNET™ which is an adhesive web manufactured and sold by Applied Extrusion Technology, Inc.

Figure 2:
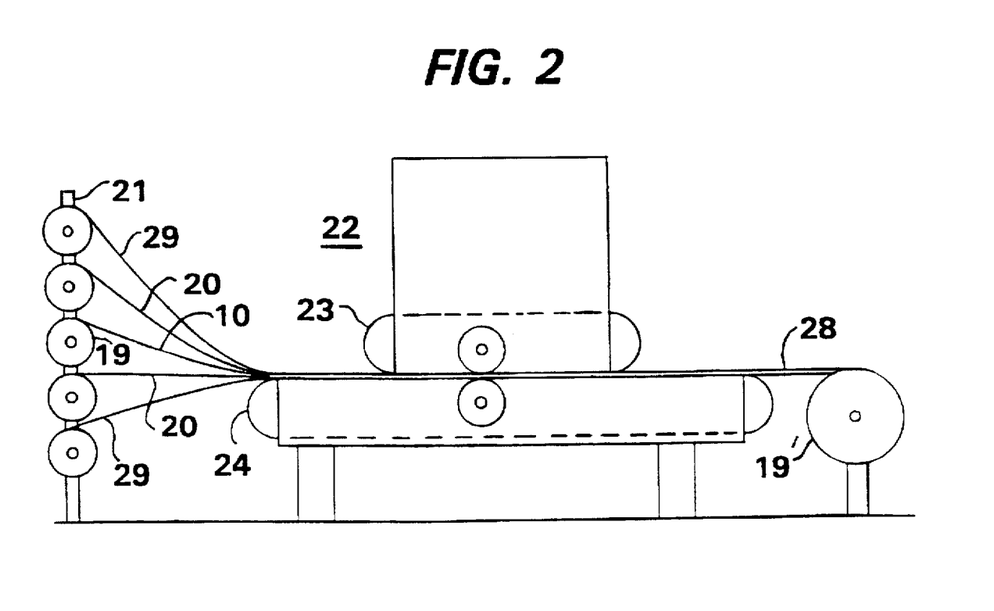
FIG. 2 is the schematic view showing the steps of manufacturing the synthetic mesh bonded to the nickel battery matrix or substrate in accordance with one embodiment of the present invention.

FIG. 2 illustrates the process for applying a resinous or polymeric coating onto the surfaces of a sintered nickel fiber-nickel powder substrate material. As shown in FIG. 2, the sintered wound nickel fiber-nickel powder substrate 10 is wound on a take up reel 19 which is mounted on a let off stand 21 for feeding into a laminator station 22. The laminator station 22 is comprised of an upper polymeric coated belt apparatus 23 and a lower polymeric belt apparatus 24 which guides the sintered nickel fiber-nickel powder substrate 10 between heated pressure rollers 25 to bond the resin or polymeric web or mesh material 20 onto the nickel fiber-nickel powder substrate 10, as will hereinafter be described.

Preferably, the polymeric or synthetic mesh or web material 20 is applied to both surfaces of the nickel fiber-nickel powder substrate 10. Accordingly, reels containing the resin netting, mesh or web 20 are mounted on the let off stand 21 to facilitate feeding of the resin netting or mesh 20 onto the upper and lower surfaces of the substrate 10. Preferably, it is desired to utilize a release liner 29 between the mesh material 20 and the lower teflon coated belt 24 and heated pressure rollers 25 as well as utilizing a release liner 29 positioned between the mesh material 20 and the upper teflon belt 23 and the heated pressure rollers 25 to prevent accumulation of the polymeric material onto the heated pressure rollers and belt.

Figure 3:
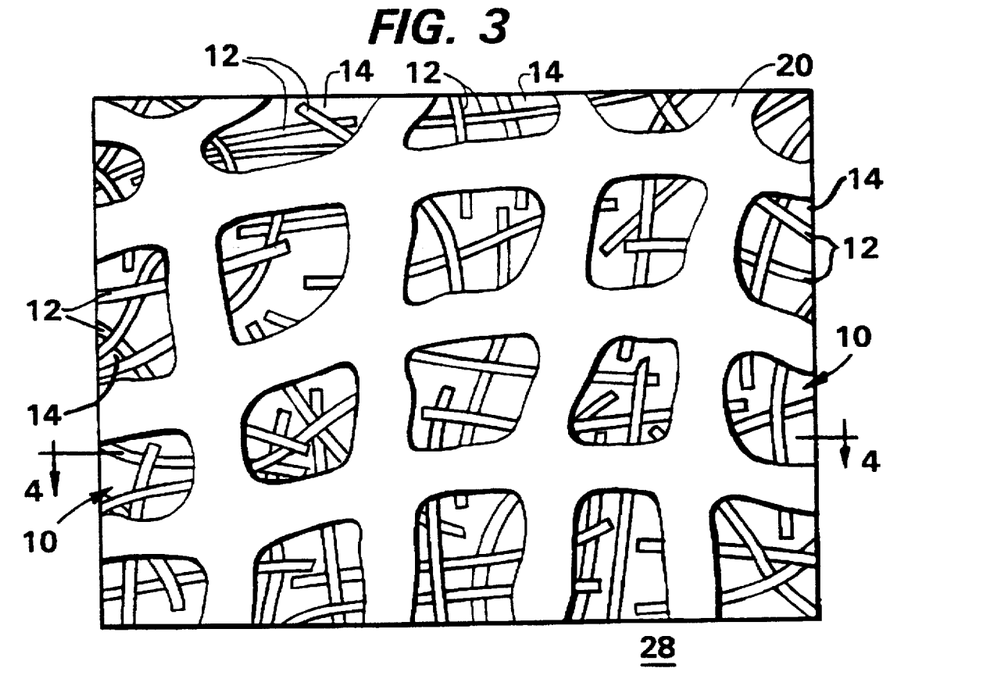
FIG. 3 is an enlarged schematic top plan view of the synthetic mesh bonded to the nickel battery substrate manufactured in accordance with FIG. 2.
Figure 4:
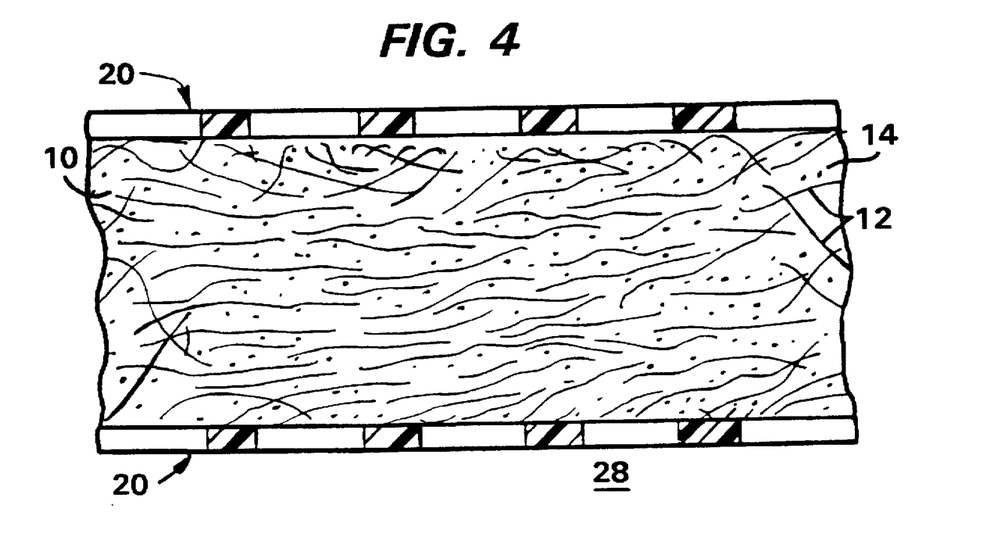
FIG. 4 is a sectional view taken along lines 4—4 in FIG. 3.

The resultant polymeric coated nickel fiber-nickel powder substrate material 28 is schematically shown in FIG. 3. In such a view, the outer covering or surface of the polymeric coated nickel fiber-nickel powder substrate includes a polymeric or mesh material 20 on the outer surface of the substrate 10 with the inner portion of the substrate being comprised of long nickel fibers 12 and nickel powder 14. The polymeric or mesh material 20 when heated and applied to the bonded surface of the substrate 10 yields a non-uniform open spaced covering that permits the battery manufacturer to load the polymeric coated nickel fiber-nickel powder substrate with the active chemical materials for completing the assembly of a cell. Additionally, it has been found that the nickel fiber-nickel powder substrate when coated with a polymeric mesh coating, as described above, provides a substrate surface effect which substantially reduces battery cell shorting and provides extended rechargeable battery cell life cycling performance by substantially reducing the number of metallic fiber ends extending from the surface of the electrode when the electrode is chemically loaded and rolled or spirally-wound to complete the cell assembly.

The synthetic mesh, netting or web fabric 20 is a polymeric fabric which is preferably selected to provide a porous chemically resistant surface which is compatible with the electrolyte system used in the completed electrode battery. Although not shown in the drawings, the synthetic mesh or web fabric 20 may be applied to the nickel fiber-nickel powder substrate 10 by utilizing a hot melt spray, an aqueous slurry, conventional air and wet layering, steam calendering of preformed fabrics and hot calender lamination of the preformed fabric.

Figure 5:
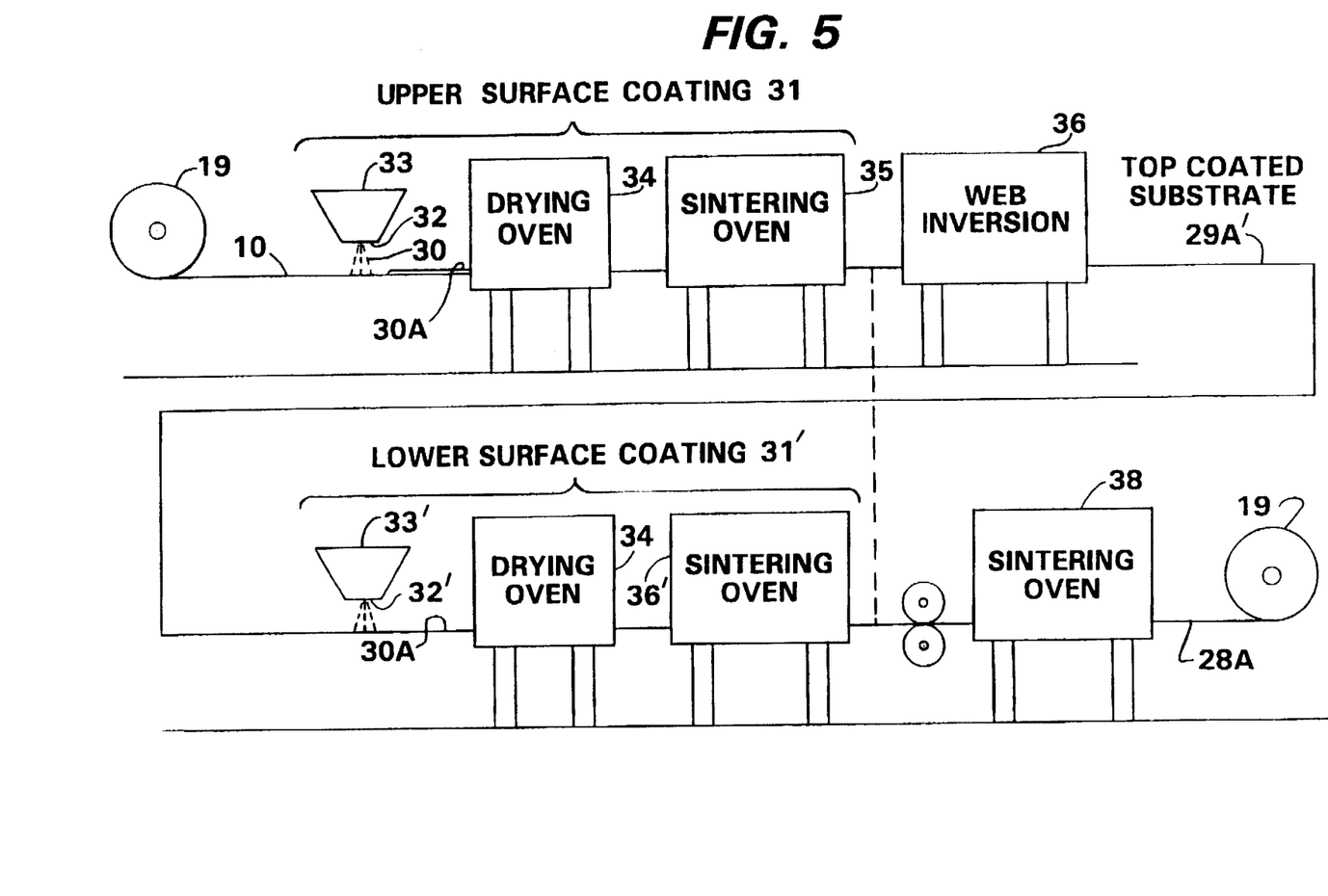
FIG. 5 is a schematic view showing the steps of manufacturing multiple layers of fine diameter fibers bonded to a surface of a nickel battery substrate in accordance with a further embodiment of the present invention.
Figure 6:
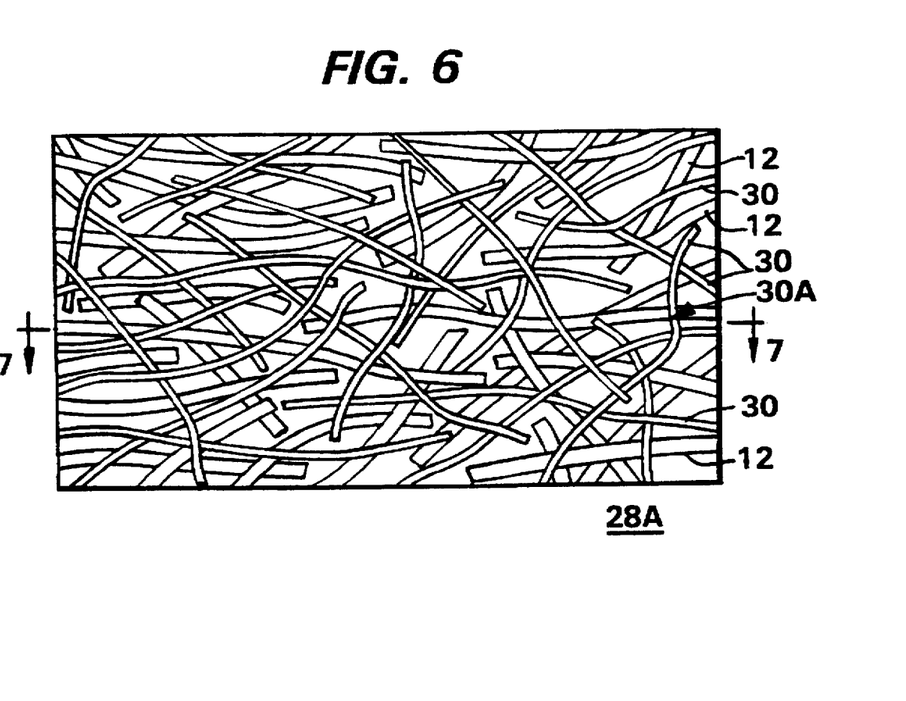
FIG. 6 is an enlarged schematic top plan view of multiple layers of fine diameter fibers bonded to a surface of a nickel battery substrate manufactured in accordance with FIG. 5.
Figure 7:
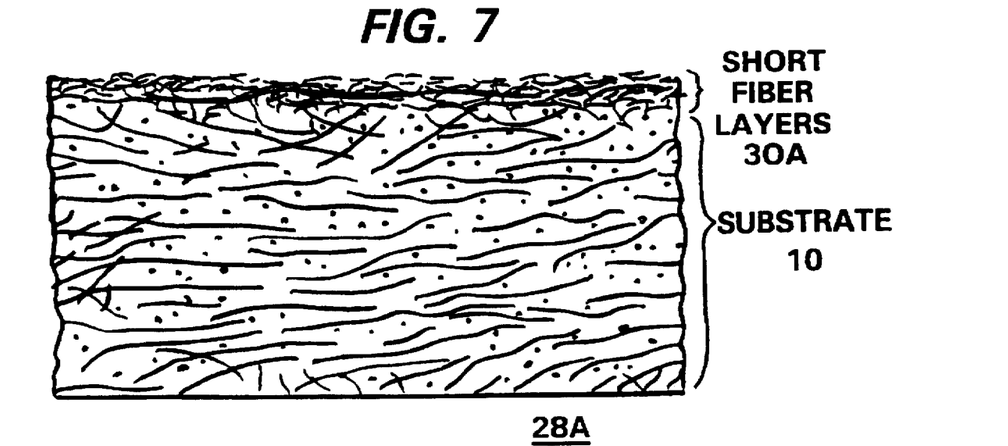
FIG. 7 is a sectional view taken along lines 7—7 in FIG. 6.

A further embodiment of the present invention is shown schematically in FIGS. 5, 6 and 7 which generally illustrate the utilization of a porous covering layer means comprised of fine diameter metallic nickel fibers 30 which are applied to and bonded to at least one or more of the outer surfaces of the three-dimensional sintered nickel fiber-nickel powder substrate 10. As shown and illustrated in FIG. 5, the process includes the uncoiling of the sintered nickel fiber-nickel powder substrate 10 from the take-up reel 19 and directing this substrate to receive fine diameter nickel fibers 30 which are applied by an upper surface coating apparatus 31 including a spray coating apparatus 32 and including reservoir 33. The fine diameter nickel fibers 30 may have a range of diameters of between 5–18 microns and preferably will have a nominal diameter of approximately 10 microns. The diameter of the fine nickel covering fibers is to be compared with the nickel fiber contained in the nickel powder substrate 10 wherein the nominal diameter of such nickel fibers is approximately 25 microns. The application of the surface coating of one or more layers of fine diameter nickel fibers 30 provides a multiple layered fiber cover or surface 30A on the nickel fiber-nickel powder substrate 10 which is then passed through a drying oven 34 and then passed through sintering oven 35 which bonds the multiple layered surface of fine diameter nickel fibers onto the larger diameter nickel fiber-nickel powder substrate 10 to provide a coated substrate 28A' having a multi-layered fine fiber surface 30A on the upper surface of the three-dimensional electrode substrate prior to the loading of the active chemical by the electrode manufacture. In the embodiment of the process illustrated in FIG. 5, a multi-layered fiber cover or surface is applied both to the upper and the lower surfaces of the substrate 10. To this end, the upper surface coated substrate 28A' provided at the output of sintering oven 35 is unloaded to a suitable web inversion apparatus 36, which inverts the substrate 28A' top to bottom, and passes the inverted substrate 28A' "lower surface-up" to a lower surface coating apparatus 31' which includes a reservoir 33', drying oven 34', sintering oven 35', calendering rollers 37 and sintering oven 38 which provide a multiple layered fiber cover or surface 30A and the lower surface of the nickel fiber-nickel powder substrate 10, thereby providing the coated substrate 28A which is wound on a take-up reel 19. For applications where only the upper surface of the substrate 10 is coated with fine diameter nickel fibers 30, the coated substrate 28A' provided at the output of the sintering oven 35 of the upper surface coating apparatus 31 can be directed to calender rolls 37, sintering oven 38 and wound on a take-up reel.

For example, it has been found that a water based slurry containing 25 percent by weight nominal 10 micron diameter nickel fibers was sprayed through the coating apparatus 32 onto the substrate 10, i.e., both on the top surface of the substrate and on the lower surface of the top coated substrate, the porous layer of fine diameter nickel fibers yielded a surface coating of containing 25 grams per meter$^2$ on each surface. The weight percent of finer diameter nickel fiber in the surface coating may range between 10 to 60 grams per meter$^2$.

As shown in FIG. 6, a schematic top view of the coated substrate 28A shows the overlying upper and lower surfaces 30A containing fine diameter nickel fibers 30 overlying the inner portion of the nickel fiber-nickel powder substrate 10 containing the larger diameter long nickel fibers 12.

Also, FIG. 7 is a cross sectional view taken through lines 7—7 of FIG. 6, showing the deposit or coating 30A of multiple layers of fine fibers 30 bonded to the surface of the nickel fiber-nickel powder substrate 10. Again, the resultant multi-layered battery electrode matrix provides an electrode structure which possesses increase loading and retention of the electrode active material. Additionally, the multiple layers 30A of fine diameter fibers 30 provides a substrate surface affect which substantially reduces battery cell shorting and provides extended rechargeable battery cell life cycling by reducing the number of metallic fiber ends which would extend from the surface of the electrode after the electrode is chemically loaded and then rolled or spirally-wound to complete the cell assembly. The layering of the fine diameter nickel fibers 30 onto the nickel fiber-nickel powder substrate 10, together with the subsequent calendering and sintering operation forms the electrode substrate into a non-woven metallic fabric of a specified density, thickness, porosity and weight, as desired by the electrode manufacturer. The layered metallic surface coating increases the conductivity and lowers the resistivity of the resultant loaded cell electrode and provides that about 2–5 percent increase in electrical capacity of resultant rechargeable batteries utilizing the multiple layer of fine fibers bonded to the three-dimensional nickel fiber-nickel powder substrate.

Figure 8:
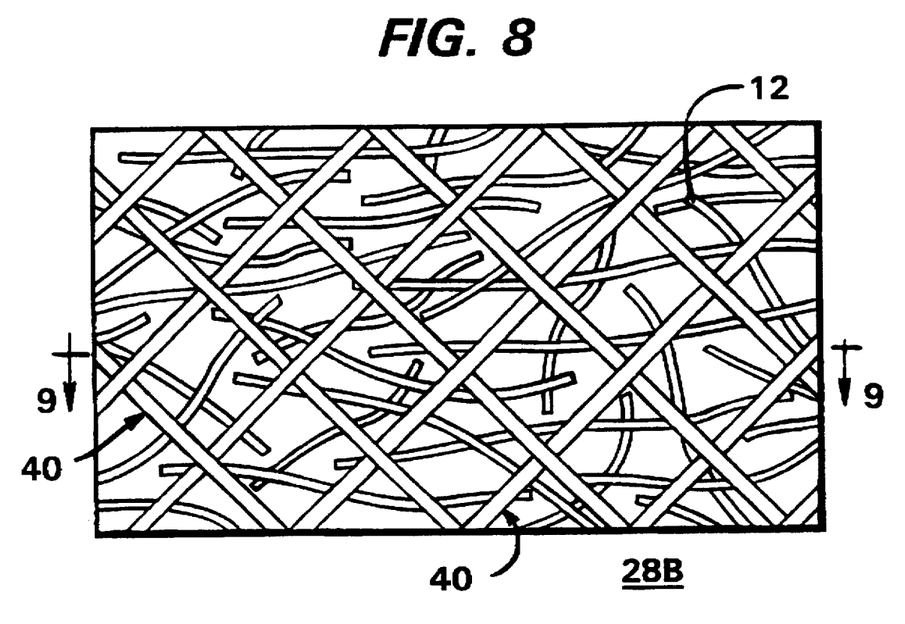
FIG. 8 is an enlarged schematic top plan view of the wire screen bonded to at least one surface of a nickel battery substrate in accordance with a further embodiment of the present invention.
Figure 9:
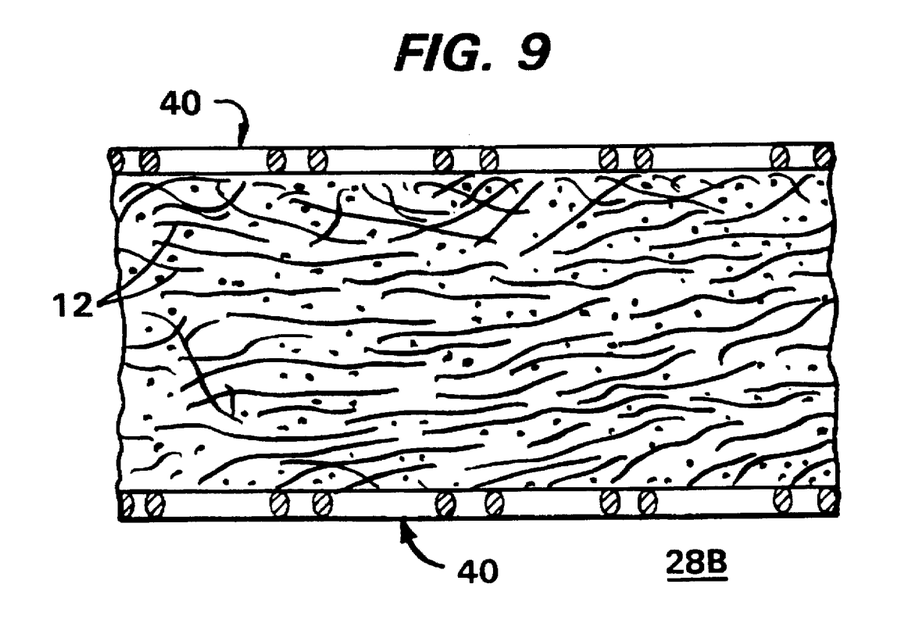
FIG. 9 is a sectional view taken along lines 9—9 in FIG. 8.

In still a further embodiment of the present invention illustrated in FIGS. 8 and 9, a flexible fine mesh metal screen 40 may be directly bonded to at least one surface of the nickel fiber-nickel powder substrate 10 to form an electrode structure 28B. The metal screen 40 is preferably of approximately 40 mesh in size and may be composed of nickel, nickel coated steel or stainless steel. The screen is bonded to at least one surface of the nickel fiber-nickel powder substrate by brazing, or spot welding or sintering to provide a substrate sandwich-like structure that may be chemically loaded and spirally-wound to complete the electrode assembly. The screen 40 prevents and substantially reduces the number of metallic fiber ends extending from the surface of the electrode after the electrode is chemically loaded and wound to complete the electrode cell assembly.

It is also within the scope of the prevent invention that the porous covering layer bonded to at least one surface of the three-dimensional electrode provides a loaded cell electrode structure that possesses increased conductivity and lowered resistivity over non-coated three-dimensional electrodes. This permits the electrode material of the present invention to be used in spiral-wound electrode cells as well as be used in planar or plaque cells which may be stacked in the completed cell assembly. Although such planar or button cells may be configured or stacked in a final cell assembly as a non-planar arc, in this sense, they are considered substantially planar for purposes of this disclosure.

TABLE I

|  | Prior Art NI Fiber Substrate | Fine Ni Fiber Bonded to Ni Fiber Substrate | Resin Bonded to Ni Fiber Substrate |
| --- | --- | --- | --- |
| LOADING Paste | 1 gm/in$^2$ 1550 gm/m$^2$ | 1.1 gm/in$^2$ 1700 gm/m$^2$ | 1.1 gm/in$^2$ 1700 gm/m$^2$ |
| LOADING Ni(OH)$_2$ | 1240 gm/m$^2$ | 1360 gm/m$^2$ | 1360 gm/m$^2$ |
| Utilization of Ni(OH)$_2$ | 80% | 83% | 80% |
| Useful Ni(OH)$_2$ | 0.8 gm/in$^2$ | 0.91 gm/in$^2$ | 0.88 gm/in$^2$ |
| Amp/Hour/m$^2$ Capacity | 286 | 326 | 314 |

As shown in Table I, the resin mesh bonded to the surfaces of a three-dimensional sintered nickel fiber-nickel powder substrate yields an amp per hour capacity of 314. The three-dimensional substrate material when coated with a multiple layer of fine nickel fibers possesses amp per hour capacity of 326. In comparison, the amp per hour capacity of a sintered nickel fiber-nickel powder substrate as an electrode material possesses an amp per hour capacity of 286. This should be compared to an amp per hour capacity of 210 for a planar electrode which is comprised of nickel powder sintered onto a metal mesh structure.

Additionally, when compared with a nickel-cadmium AA cell which possesses 550 milliamps per hour output, the output of the sintered nickel fiber-nickel powder substrate is 700, the output of the resin-mesh coated nickel fiber-nickel powder substrate is 770, and the output of the multiple-layered fine fiber bonded to the three-dimensional nickel fiber-nickel powder substrate is 790. Also, when a similar comparison is made to a nickel metal hydrid AA battery having an output of 1,000 milliamps per hour, the three-dimensional nickel fiber-nickel powder substrate possesses an output of 1272, milliamps, the resin bonded three-dimensional substrate possesses an output of 1400, milliamps, and the multi-layered fiber bonded three-dimensional nickel fiber-nickel powder substrate possesses an output of 1436. Accordingly, a porous covering layer means positioned on at least one surface of the three-dimensional nickel fiber-nickel powder substrate provides for significant improved output as well as for significant improved loading of the active chemical material into the substrate.

Additionally, such treated and layered structures made in accordance with the present invention result in a manufacturing loss of less than one half of one percent due to shorting problems. This is compared to a manufacturing loss of approximately 10 percent due to shorting when the three-dimensional nickel fiber-nickel powder substrate in accordance with the prior art is spirally-wound into an electrode cell. Thus, because the novel structures in accordance with the present invention retain more active material by utilizing and retaining more of the active material or nickel hydroxide there exist approximately a 10–12 percent improvement in the utilization of the active material in the resultant electrode cell assembly, thereby substantially increasing the output of the electrode cell.

We claim:

1. A three-dimensional electrode composite for use in constructing battery electrodes comprising:

a sintered matrix material selected from the group consisting of reticulated metal foams, conductive fibers and metal powder compacts, a porous covering layer means bonded to at least one surface of said sintered matrix material, and an active chemical material loaded through said porous covering layer means into said sintered matrix material, with said porous covering layer means sized with openings therein to permit loading of said active chemical material through said layer means into said sintered matrix material while retaining said chemically loaded matrix material within the planar surface of said at least one surface of said matrix material.

2. The three-dimensional electrode material composite in accordance with claim 1, wherein said porous covering layer means retains said chemically loaded said matrix material substantially within the planar surface of at least one surface of said matrix material during spiral-winding of the chemically loaded matrix material for constructing a spirally-wound battery electrode.

3. The three-dimensional electrode composite in accordance with claim 2 wherein said porous covering layer means is a polymeric mesh material.

4. The three-dimensional electrode composite in accordance with claim 3 wherein said polymeric mesh material is selected from the group consisting of polyesters, polyolefins and polyamides.

5. The three-dimensional electrode composite in accordance with claim 3 wherein said polymeric mesh material is nylon.

6. The three-dimensional electrode composite in accordance with claim 2 wherein said porous covering layer means is comprised of nickel fibers having a diameter between about 5–18 microns.

7. The three-dimensional electrode composite in accordance claim 6 wherein said nickel fibers have a diameter of about 10 microns.

8. The three-dimensional electrode composite in accordance with claim 1 wherein said sintered matrix material is comprised of conductive metal fibers.

9. The three-dimensional electrode composite in accordance with claim 8 wherein said sintered matrix material is comprised of 70–90 weight percent nickel fibers and 30–10 weight percent nickel powder.

10. The three-dimensional electrode composite in accordance claim 8 wherein said conductive metal fibers are comprised of 80 weight percent nickel fiber and 20 weight percent nickel powder.

11. The three-dimensional electrode composite in accordance claim 8 wherein said porous covering layer means is a polymeric mesh material.

12. The three-dimensional electrode composite in accordance with claim 11 wherein said polymeric mesh material is selected from the group consisting of polyesters, polyolefins and polyamides.

13. The three-dimensional electrode composite in accordance with claim 11 wherein said polymeric mesh material is nylon.

14. The three-dimensional electrode composite in accordance with claim 9 wherein said porous covering layer means is comprised of nickel fibers having a diameter between about 5–18 microns.

15. The three-dimensional electrode composite in accordance with claim 14 wherein said porous covering layer means bonded to at least one surface is comprised of a coating weight of nickel fibers of between 10–100 grams per meter$^2$.

16. The three-dimensional electrode composite in accordance with claim 15 wherein said coating weight of nickel fibers is about 25 grams per meter$^2$.

17. The three-dimensional electrode composite in accordance with claim 2 wherein said porous covering layer is a flexible metal screen.

18. The three-dimensional electrode composite in accordance with claim 17 wherein said flexible metal screen is a 40 mesh screen.

19. The three-dimensional electrode composite in accordance with claim 17 wherein said flexible metal screen is selected from a group consisting of nickel, nickel coated steel and stainless steel.

20. The three-dimensional electrode material in accordance with claim 1 wherein said porous covering layer means retains said chemically loaded matrix material substantially within the planar surface of said at least one surface of said matrix material when said chemical loaded matrix material plates are assembled into a substantially planar battery electrode.

21. The three-dimensional electrode composite in accordance with claim 20 wherein said porous covering layer means is a polymeric mesh material.

22. The three-dimensional electrode composite in accordance with claim 21 wherein said polymeric mesh material is selected from the group consisting of polyesters, polyolefins and polyamides.

23. The three-dimensional electrode composite in accordance with claim 21 wherein said polymeric mesh material is nylon.

24. The three-dimensional electrode composite in accordance with claim 21 wherein said porous covering layer means comprised of nickel fibers having a diameter between about 5–18 microns.

25. The three-dimensional electrode composite in accordance claim 24 wherein said nickel fibers have a diameter of about 10 microns.

26. The three-dimensional electrode composite in accordance with claim 20 wherein said sintered matrix material is comprised of conductive metal fibers.

27. The three-dimensional electrode composite in accordance with claim 26 wherein said conductive metal fibers are comprised of 70–90 weight percent nickel fibers and 30–10 weight percent nickel powder.

28. The three-dimensional electrode composite in accordance with claim 27 wherein said conductive metal fibers are comprised of 80 weight percent nickel fiber and 20 weight percent nickel powder.

29. The three-dimensional electrode composite in accordance claim 27 wherein said porous covering layer means is a polymeric mesh material.

30. The three-dimensional electrode composite in accordance with claim 29 wherein said polymeric mesh material is selected from the group of polyesters, polyolefins and polyamides.

31. The three-dimensional electrode composite in accordance with claim 29 wherein said polymeric mesh material is nylon.

32. The three-dimensional electrode composite in accordance with claim 30 wherein said porous covering layer means is comprised of nickel fibers having a diameter between about 5–18 microns.

33. The three-dimensional electrode composite in accordance claim 32 wherein said porous covering layer means bonded to at least one surface is comprised of coating weight of nickel fibers of between 10–100 grams per meter$^2$.

34. The three-dimensional electrode composite in accordance with claim 33 wherein said coating weight of nickel fibers is about 25 grams per meter$^2$.

35. The three-dimensional electrode composite in accordance with claim 20 wherein said porous covering layer is a flexible metal screen.

36. The three-dimensional electrode composite in accordance with claim 35 wherein said flexible metal screen is a 40 mesh screen.

37. The three-dimensional electrode composite in accordance with claim 35 wherein said flexible metal screen is selected from a group consisting of nickel, nickel coated steel and stainless steel.

* * * * *